United States Patent [19]

Barlock

[11] 4,174,021
[45] Nov. 13, 1979

[54] LADDER TRUCK

[75] Inventor: Norman A. Barlock, Oakville, Canada

[73] Assignee: Alnor Material Handling Limited, Canada

[21] Appl. No.: 906,694

[22] Filed: May 16, 1978

[51] Int. Cl.$^2$ .............................. E06C 5/02; B62B 5/04
[52] U.S. Cl. .............................. 182/17; 182/97;
   182/129; 182/127; 280/163
[58] Field of Search ............ 182/15, 17, 127, 97,
   182/96, 95, 106, 129; 280/163, 291, 150.5

[56] References Cited
U.S. PATENT DOCUMENTS

| 2,377,043 | 5/1945 | Samuelson | 182/17 |
| 2,707,585 | 5/1955 | Hoey | 182/17 |
| 3,556,248 | 1/1971 | Brown | 182/15 |

FOREIGN PATENT DOCUMENTS

| 163266 | 5/1958 | Sweden | 182/15 |
| 903771 | 8/1962 | United Kingdom | 182/15 |

Primary Examiner—Reinaldo P. Machado
Attorney, Agent, or Firm—Hirons & Rogers

[57] ABSTRACT

A ladder truck, e.g. for use in stores for transporting goods from central storage to display shelves and for facilitating the loading of such goods on display shelves, comprises a wheeled truck having attached to one end a stepladder. The stepladder is pivotally secured to one end, and has a first position in which it is wholly supported by the truck, clear of the ground, so that the truck can be wheeled around without interference from the stepladder and a second position in which the lowermost extremities of the stepladder engage the ground or floor surface, and take a portion of the weight of the truck, so that the adjacent wheels of the truck are raised clear of the supporting ground surface. Then, with the truck resting on a single wheel or pair of wheels and on the base of the stepladder, the truck is effectively locked against accidental rolling movement across the surface, and the stepladder can be safely mounted. The stepladder is easily moved from one position to another by simple manual operation.

5 Claims, 5 Drawing Figures

LADDER TRUCK

FIELD OF THE INVENTION

This invention relates to movable trucks, of the type adapted to be moved by a single person, by hand. More specifically, it relates to a ladder truck comprising a wheeled truck portion and a stepladder combined therewith.

BACKGROUND OF THE INVENTION

In many environments and applications, it is desirable to have a small, simple, hand operated truck or cart by means of which goods may be moved from one location to another. Frequently, however, after transportation of the goods on the truck, the operator needs to stack them or place them at a high level such as a raised shelf. Unless the truck is provided with some secure means for locking the wheels against accidental rolling movement, it is dangerous for the operator to climb up on the truck in order to unload the goods and raise them to an elevated level. The transportation along with the goods of a means such as a stepladder by means of which the operator may reach high levels cuts down upon the available transportation space provided by the truck.

A particular example of an application for such a hand operated truck is in retail supermarket operation, where it is necessary frequently to transport retail articles such as food packages from central storage out onto display shelves, within the store, which shelves may be of elevated height.

A combination of a truck and a ladder, as a single unit, would clearly be of utility in such operations. However, any such combination must meet the criteria of easy and safe operation, both as a truck and as a ladder, without unduly restricting the transportation capacity of the truck.

BRIEF DESCRIPTION OF THE PRIOR ART

Various types of transportable ladder, and combination ladder trucks, have been proposed in the past for different purposes. For example, U.S. Pat. No. 3,731,947 Fontaine shows a form of foldable trolley which can be attached to an extension ladder or the like, to aid in transportation of the ladder itself. The trolley has three wheels, and is extendable and contractible. When it is extended, the ladder can be moved around on the wheels of the trolley. When the ladder is in use, the trolley folds to a position in which the ladder base is on the ground and all of the three wheels of the trolley are raised above the level of the ground. This patent however does not show any combination transportation trolley and ladder, and does not show any means for providing support for the ladder, independently of the structure against which the ladder is to be rested.

U.S. Pat. No. 1,701,951, Holt shows a combined ladder and truck for use by a tailor. The ladder is provided at one end of the truck. The ladder is spring loaded so that its feet engage the ground when a person's weight is on the ladder, so as to reduce the chance of accidental movement of the truck when the ladder is in use.

U.S. Pat. No. 3,020,972 Hockett shows a combined utility cart, e.g. for cleaning purposes, and a ladder, the cart being adapted to transport mops and pails and the like. The ladder is at one end of the cart, and can be disposed in a raised position for wheeling the cart, and a lowered position to allow a person to mount the ladder. The person's weight on the ladder is relied upon to prevent the cart from accidentally rolling whilst the ladder is in use.

U.S. Pat. No. 3,684,055 Rice shows a scaffold structure with a stepladder within a wheeled frame. The castors of the wheel frame can be moved downwardly into ground engagement by means of a mechanism including a mechanical lever, which is separate from the ladder. Four ground engaging feet are provided on the frame within which the ladder is mounted.

U.S. Pat. No. 2,990,764 Wilder shows a combined camera support, cart and stepladder, provided with a single pair of wheels and a stepladder, extendable from a closed, move-around position to an open, climbable position.

SUMMARY OF THE INVENTION

It is an object of the present invention to provide a new and improved combination ladder truck.

It is a further object of the invention to provide a ladder truck set forth which is simple in use and operation, and is safe to use as both a transportation truck and a stepladder.

It is a further object of the present invention to provide a ladder truck wherein the provision of separate, special wheel locking means to prevent accidental movement of the truck when the ladder is in use is rendered unnecessary.

The present invention provides a combination ladder truck, of particular utility in retail supermarket operation, in which the stepladder portion is pivotally mounted to one end of the truck portion. In one position, the stepladder is raised up, so that its bottom extremity is clear of the ground, and it is wholly supported by the truck portion, so the truck can be rolled across the ground or floor surface on its wheels, without interference from the stepladder. By a simple pivotal movement of the stepladder relative to the truck portion, however, the bottom extremity of the stepladder can be brought into ground engagement, and then by further pivotal movement, the wheels of the truck portion at the end adjacent the stepladder are raised off the ground, so that the bottom extremities of the stepladder support a portion of the weight of the truck. Then, the truck is effectively locked into position by having its weight taken in part on the bottom extremities of the stepladder, and the stepladder can be safely mounted without fear of accidential rolling movement of the truck.

Thus according to the present invention, there is provided a ladder truck comprising:

a truck portion having first and second supporting wheel formations near opposed ends thereof, on which the ladder truck may be rolled across a surface;

a stepladder movably secured to the truck portion and having downwardly extending service engaging extremities;

said stepladder being movable relative to the truck portion between:

a first postion in which the stepladder is supported by the truck portion with its downwardly extending extremities clear of the surface on which said wheel formations rest, so as to permit the ladder truck to be rolled across the surface on its wheeled formations;

and a second position in which its downwardly extending extremities engage the surface and support a portion of the weight of the ladder truck thereon, with the first said supporting wheel formations raised out of engagement with the surface.

DESCRIPTION OF THE PREFERRED EMBODIMENTS

Preferably, the ladder truck according to the present invention also has a third, intermediate position of the stepladder relative to the truck portion, through which the stepladder is moved in order to move it from the first said position to the second said position. In this third, intermediate position, the downwardly extending extremities thereof rest on the surface, and a portion of the weight of the ladder truck is supported on the first supporting wheel formations, so that all of the wheel formations of the ladder truck are resting on the ground. The movement of the stepladder between its three said positions is preferably angular movement in a generally vertical plane, with change in the vertical angular disposition of the stepladder relative to the truck portion, at each of the three positions.

In the first position, in which the stepladder is supported by the truck portion, it is preferred that the stepladder portion rest against stop formations provided on the truck portion, exerting a portion of the weight of the stepladder against said stop formations in a direction towards the end of the truck remote from the end of attachment to the stepladder. By such an arrangement, a degree of lifting of the stepladder has to take place in order to move it from its first position to its intermediate position, so that the stepladder is stable in its first position, and there is little fear of accidental movement of the stepladder from its first position to its second position engaging the ground.

The truck ladder combination according to the present invention is thus simple and easy to operate, and avoids the use of complicated wheel locking mechanisms, hydraulic lifting means, spring loadings and the like, to ensure its stability. The device can be built in a variety of sizes, and can be operated by a single operator, wheeling the truck around as required, and moving the stepladder between its various positions for versatility of operation.

BRIEF REFERENCE TO THE DRAWINGS

DETAILED DESCRIPTION OF THE SPECIFIC PREFERRED EMBODIMENT

Figure 1:
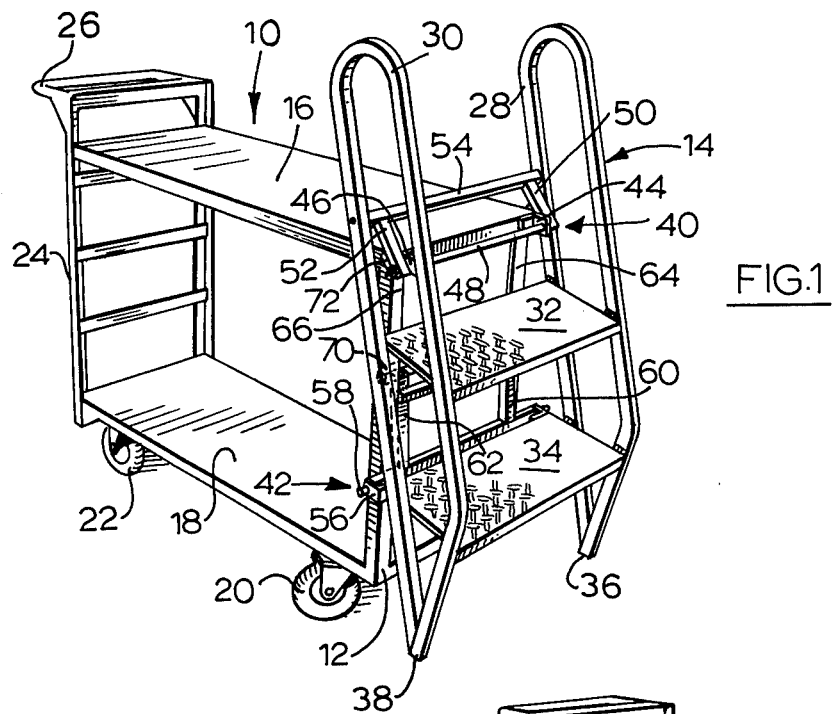
FIG. 1 is a perspective view of a ladder truck according to the specific preferred embodiment of the present invention, in its first position, with the stepladder clear of the ground surface.
Figure 2:
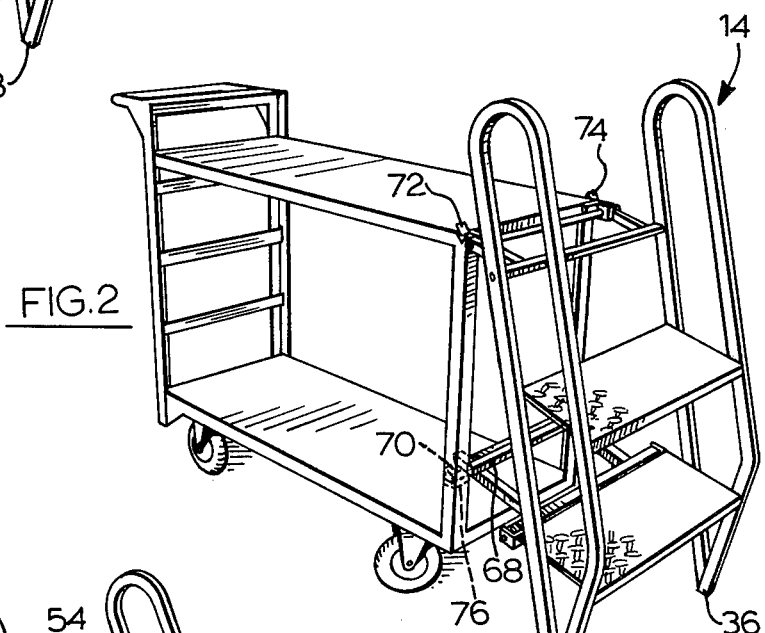
FIG. 2 is a view similar to FIG. 1, with the stepladder in its intermediate, third position, resting on the ground surface.
Figure 3:
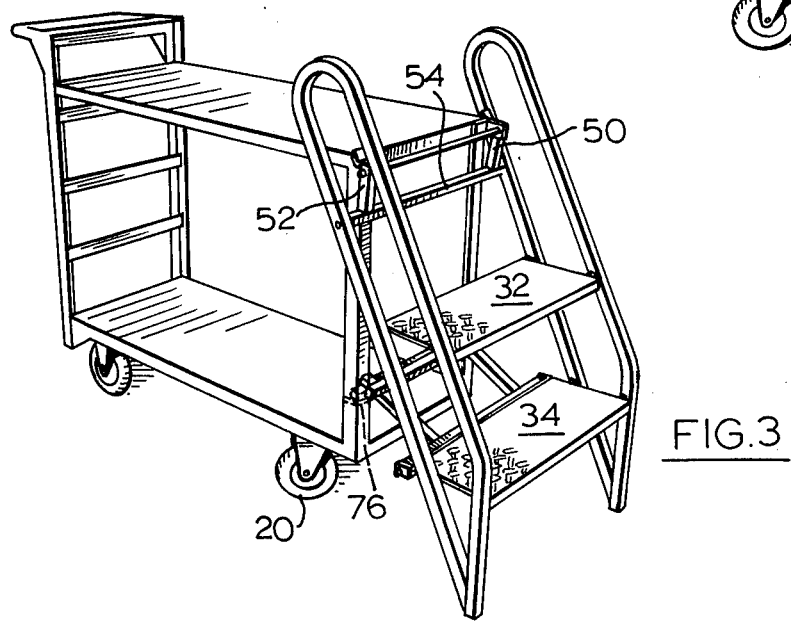
FIG. 3 is a view similar to FIGS. 1 and 2, with the stepladder in its second position taking part of the weight of the truck portion, and with the adjacent supporting wheels thereof raised clear of the ground.

Referring now to the drawings, in which like numerals indicate like parts, more especially to FIGS. 1–3, the ladder truck shown therein comprises a wheeled truck portion 10, to the forward end 12 of which is pivotally secured a stepladder 14. The truck portion has upper and lower carrying surfaces 16, 18 respectively. Supporting wheel formations are mounted on the underside of the lower surface 18, in the form of pairs of castored front wheel 20 and castored rear wheel 22. The rear end of the ladder truck comprises a vertically upstanding frame 24 with an integral handle 26 extending rearwardly therefrom, by means of which the ladder truck may be pushed or pulled along, over the supporting surface or ground.

The stepladder 14 comprises a pair of mutually upstanding side frame members 28, 30 and a pair of shelf-like rungs 32, 34 fixedly secured at each end to the side frame members 28, 30 as by welding. The side frame members 28, 30 have respective downwardly extending extremities 36, 38 of small areal extent.

The stepladder 14 is connected to the forward end 12 of the truck portion 10 at an upper location generally designated 40, where there is a pivotal connection between the truck portion 10 and the ladder 14 through link arms, and a lower location generally designated 42 where there is a sliding and pivotal connection therebetween, so that the stepladder 14 may move angularly relative to the truck portion 10 in a generally vertical plane, and forwardly and backwardly thereof, to a limited extent. At the upper location 40, truck portion 10 is provided with a pair of rearwardly extending lugs 44, 46, one at each side thereof, with an upper pivot shaft 48 extending generally horizontally therebetween, and journalled for rotation in apertures in the lugs 44, 46. A pair of link arms 50, 52 are provided, fixedly secured at one of their ends to the ends of the pivot shaft 48, and fixedly secured at their other ends to a cross-bar 54 extending between and pivotally secured to the side frame members 28, 30.

At the lower connecting location 42, the lower rung 34 of the stepladder 14 is provided with rearwardly projecting lugs 56 in which is journalled a lower pivot shaft 58 to extend horizontally along the rearward edge of the rung 30. A pair of lower link arms 60, 62 are pivotally mounted on the lower pivot shaft 58, for movement in a vertical plane. The arms 60, 62 are disposed inside the end frame defined by the two upstanding angle frame members 64, 66 of the forward end 12 of the truck portion 10. Outer and inner cross members 68, 70 extend horizontally between arms 60, 62 and extend a short distance beyond, so that the webs of the angle frame members 64, 66 are disposed between the cross members 68, 70, and the cross members 68, 70 can thus slide up and down the frame member 64, 66 in response to angular movement in the vertical plane of arms 60, 62. Stop formation 76 are provided on the frame members, to engage and define the lower limit of travel of cross-member 70.

Figure 4:
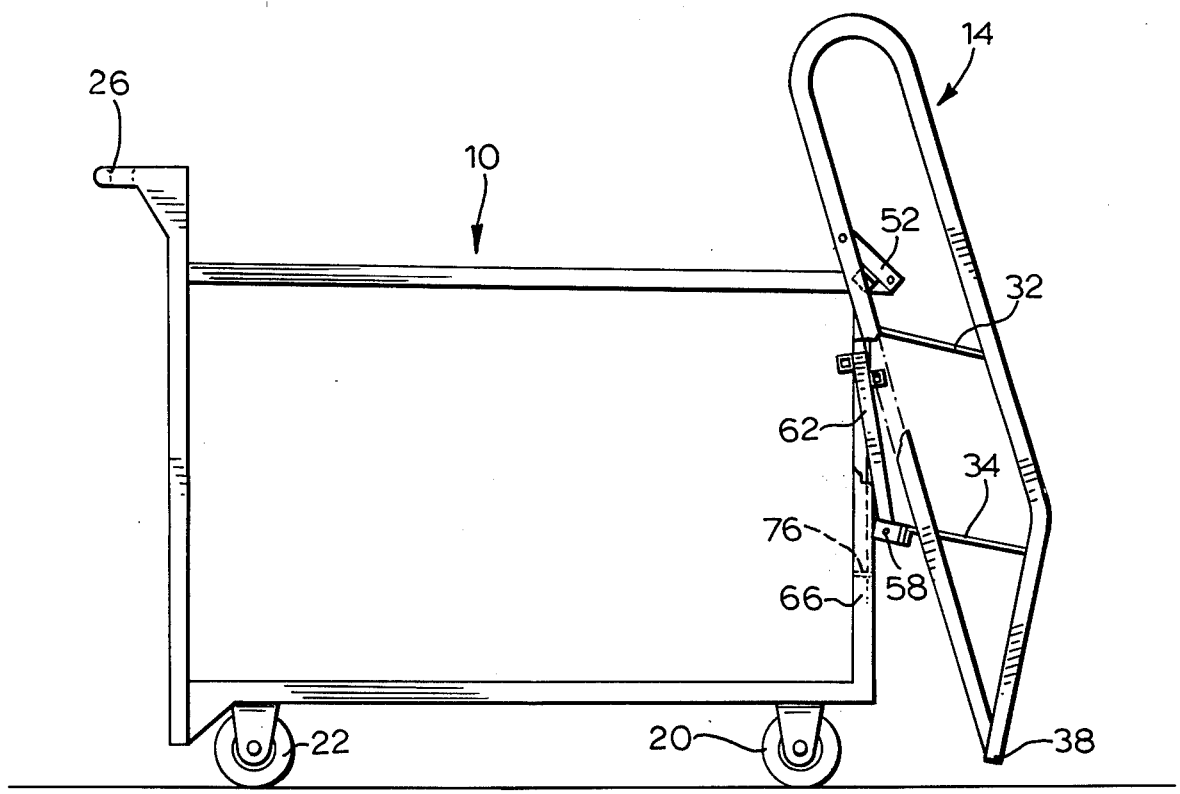
FIG. 4 is a diagrammatic side elevation of the ladder truck with the stepladder in its first position, corresponding to that shown in FIG. 1.

The frame members 64, 66 are provided at their upper extremities with laterally extending, rearwardly inclined brackets 72, 74, acting as stops against which link arms 50, 52 rest when the stepladder 14 is in its first position, as shown in FIGS. 1 and 4. In this position, the lower extremities 36, 38 are clear of the surface so that the ladder truck can be wheeled around on wheels 20, 22. The stepladder is safely supported by its own weight, leaning rearwardly against brackets 72, 74. To come out of this position it needs to be raised, to allow link arms 50, 52 to pivot about pivot shaft 48, so that accidental movement of the ladder 14 to a lower position is highly unlikely to occur. Moreover, the shelf-like rungs 32, 34 are disposed at a substantial angle to the horizontal, as shown in FIGS. 1 and 4, effectively to discourage climbing of the ladder 14 in this unsafe disposition.

When it is desired to move the stepladder relative to the truck portion 10 to bring the stepladder 14 into use, an operator may grasp the upper portions of the side frame members 28, 30 of the ladder, and lift them upwardly whilst drawing them rearwardly, thereby causing link arms 50, 52 to pivot upwardly and rearwardly in the vertical plane. As the side frame members 28, 30 and the stepladder 14 as a whole move rearwardly as a result of this upward and rearward movement, lower link arms 60, 62 start to pivot downwardly and rearwardly in the vertical plane about lower pivot shaft 58, with their ends and the cross members 68, 70 sliding downwardly, down the web of the angle frame members 64, 66 of the front end of the truck portion 10. This movement of the stepladder 14 continues until link arms 50, 52 have passed their uppermost position, and assumed a substantially horizontal, forwardly extending disposition and the lower extremities 36, 38 of the ladder 14 have come to rest upon the ground surface. This is the intermediate, third position of the ladder with respect to the truck, illustrated in FIG. 2. Now, cross members 68, 70 on either side of the angle frame members 64, 66 have engaged stop formations 76 on these angle members, preventing further downward movement thereof. The lower link arms 60, 62 now extend forwardly from the end 12 of the truck portion 10. The vertical height of the stop formation 76 thus determines the angle assumed by the link arms 60, 62 in this position, and determines the distance of the bottom of the ladder 38 from the end of the truck, for stability of the ladder.

In order that the stepladder 14 may be moved from the intermediate, third position shown in FIG. 2 to its second, ladder using position shown in FIG. 3, the upper portion of the ladder 14 is pushed firmly by the operator in the rearward direction, i.e. towards the truck portion 10. Engagement of the bottom extremities 38 of the ladder with the ground prevents movement of the truck at this time. This case link arms 50, 52 to rotate further in the clockwise direction with reference to the drawings, and further causes lower link arms 60, 62 to pivot downwardly passed the horizontal position, and therey raise forward wheels 20 of the truck off the ground. This raising effect is achieved by the rotation of the upper link arms 50, 52, to and slightly past the vertically downwardly extending position, and the similar downward pivoting of the lower link arms 60, 62, whilst the lower extremities 36, 38 of the ladder 14 remain in contact with and effectively immovable relative to the ground surface. Since the upper link arms, in this third position shown in FIGS. 3 and 5, have moved slightly rearwardly of the vertically downward position, the ladder is stable for mounting, the weight of the mounter of the ladder being exerted in a direction pushing the upper link arms 50, 52 away from their first and third dispositions. With the front wheels 20 raised off the ground, the assembly now rests on the lower extremities 36, 38 of the stepladder and the rear wheels 22, and is hence stable and protected against rolling accidentally whilst a person climbs the ladder. The stability of the ladder is enhanced by the distance of its lowermost extremities 36, 38 from the end of the truck, as determined by stop formation 76 and link arms 62.

Figure 5:
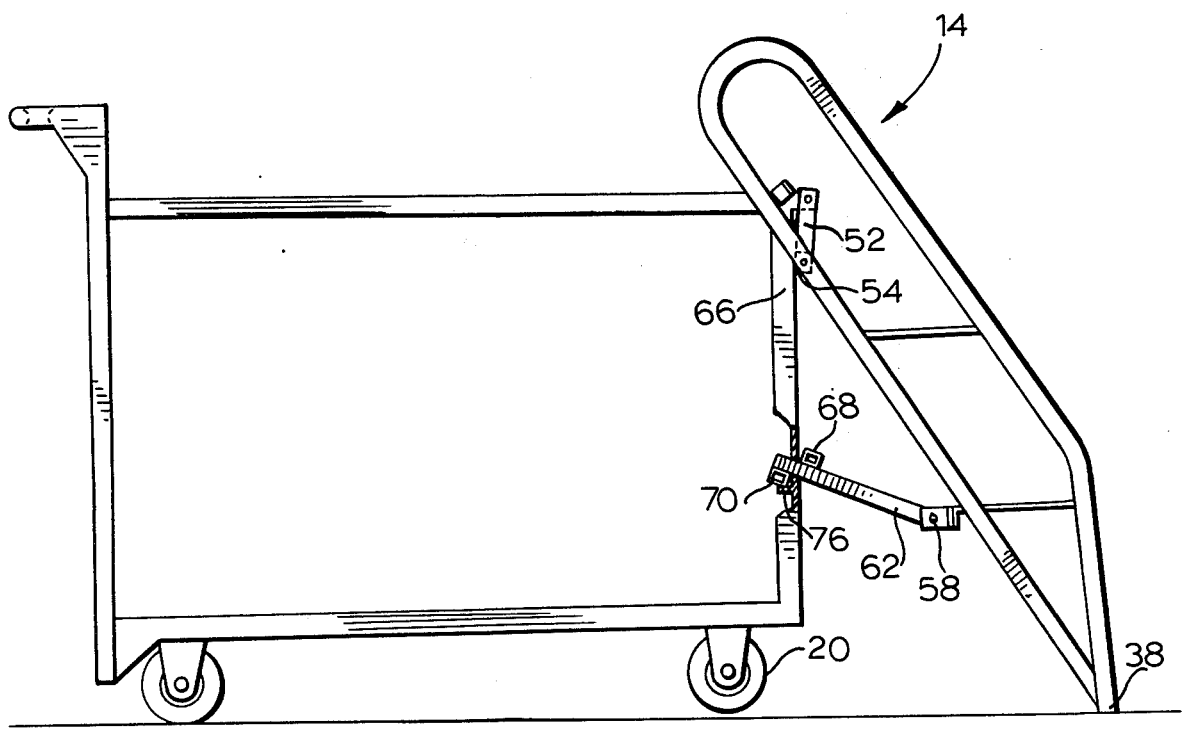
FIG. 5 is a similar side elevation, but corresponding to FIG. 3, with the stepladder of the ladder truck in its second position.

It will also be noted that, only when the ladder reaches this second position shown in FIGS. 3 and 5, do the rungs thereof 32, 34 present a substantially horizontal surface for climbing purposes. They thus effectively invite the stepladder to be climbed only when it is correctly disposed in relation to the truck to be safe for such operation.

In order to restore the stepladder from the position shown in FIGS. 3 and 5 to that shown in FIG. 2, the upper part of the ladder is grasped and jerked forwardly, to bring the upper link arms 50, 52 passed the vertically downward position back to the generally horizontal, forwardly extending position shown in FIG. 2. At the same time, the lower link arms return to their substantially horizontal, slightly upwardly extending position shown in FIG. 2 and the truck portion 10 lowers to bring the front wheels 20 back into engagement with the ground surface. Then, to restore the position shown in FIGS. 1 and 4, the ladder portion 14 is grasped and lifted slightly, and pushed rearwardly until the upper link arms move passed the vertically upwardly extending position and into resting contact with the stop formations 72, 74 on the body of the truck.

Thus the combination ladder truck described herein provides a simple, convenient appliance of particular utility in retail supermarkets, for the transportation of goods. It is a simple and easy operation to bring the latter into a usable disposition, in which it can be used safely. There is no need to conduct extra operations such as wheel locking and the like, which the operator is apt to forget and hence use the combined truck in an unsafe condition. The ladder is effectively unusable, and obviously unusable to the operator, until it is put into its correct, safe disposition. Reliance upon spring loading of ladder legs and the like, which is uncertain as the truck ages, is avoided.

It will be appreciated that the invention is not to be construed as limited to the specific embodiment described herein in detail, which is shown for illustration purposes only. The scope of the invention is defined by the appended claims.

We claim:
1. A ladder truck comprising:
   a truck portion having first and second supporting wheel formations near opposed ends thereof, on which the ladder truck may be rolled across a surface;
   a step ladder movably secured to the truck portion at the first end thereof and having a single pair of downwardly extending surface engaging extremities;
   a pair of pivot arms pivotally connected at one end to the upper part of the first end of the truck portion and pivotally connected at the other end to an upper portion of the step ladder;
   said step ladder being movable relative to the truck portion by pivoting movement of said pivot arms in a vertical plane relative to both the truck portion and the step ladder, between:
   a first position in which the step ladder is supported by the truck portion with its downwardly extending extremities clear of the surface on which said wheel formations rest, so as to permit the ladder truck to be rolled across the surface on its wheeled formations, the pivot arms in said first position extending from their connection to the end of the truck portion to their connection to the step ladder in a direction upwardly and rearwardly towards the centre of the truck portion;

an intermediate portion in which the pair of downwardly-extending extremities of the step ladder, and each of the supporting wheel formations, rest on said surface, the pivot arms in said intermediate position extending outwardly in a direction away from the truck portion;

and a second position in which the downwardly-extending extremeties of the step ladder engage the surface and support a portion of the weight of the ladder truck thereon, with the first said supporting wheel formations raised out of engagement with the surface, the pivot arms in said second position extending from their connection to the end of the truck portion to their connection to the step ladder in a direction downwardly and rearwardly towards the centre of the truck.

2. The ladder truck of claim 1 wherein the truck portion thereof has stop formations at the ladder attaching end thereof, against which the step ladder rests when in said first position, the step ladder in said first position being angularly disposed to lean its weight against said stop formations.

3. The ladder truck of claim 2 including a further pivotal and sliding connection between the step ladder and the truck portion at a lower location thereof, said pivotal and sliding connection comprising link arms pivotally connected to the step ladder and slidably connected to the end of the truck portion for relative vertical sliding movement thereon.

4. The ladder truck of the claim 3 including lower stop means on the end of the truck for engagement with said link arms so as to define their lower most sliding position relative to the end of the truck, and to define the separation of the lowermost extremity of the step ladder from the end of the truck when the stepladder in in its second said position.

5. The ladder truck of claim 4 wherein the step ladder includes a plurality of shelf-like rungs, each of said rungs being disposed in a substantially horizontal position when the step ladder is in its second, mounting position, and in a non-horizontal position when the step ladder is in its first and its intermediate positions.

* * * * *